(12) United States Patent
Kirchmair et al.

(10) Patent No.: US 11,299,221 B2
(45) Date of Patent: Apr. 12, 2022

(54) TRANSVERSE BAR FOR TRACKS OF SNOW GROOMERS

(71) Applicant: PRINOTH S.P.A., Vipiteno (IT)

(72) Inventors: Martin Kirchmair, Pfons (AT); Gregor Maurer, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 543 days.

(21) Appl. No.: 16/331,411

(22) PCT Filed: Sep. 27, 2017

(86) PCT No.: PCT/IB2017/055908
§ 371 (c)(1),
(2) Date: Mar. 7, 2019

(87) PCT Pub. No.: WO2018/060884
PCT Pub. Date: Apr. 5, 2018

(65) Prior Publication Data
US 2019/0210672 A1 Jul. 11, 2019

(30) Foreign Application Priority Data
Sep. 27, 2016 (IT) .................. 102016000096899

(51) Int. Cl.
*B62D 55/28* (2006.01)
*B62D 55/06* (2006.01)
*B62D 55/24* (2006.01)
*E01H 4/02* (2006.01)

(52) U.S. Cl.
CPC .......... *B62D 55/286* (2013.01); *B62D 55/06* (2013.01); *B62D 55/24* (2013.01); *E01H 4/02* (2013.01)

(58) Field of Classification Search
CPC ...... B62D 55/286; B62D 55/06; B62D 55/24; B62D 55/18–27
See application file for complete search history.

(56) References Cited

U.S. PATENT DOCUMENTS

| 5,354,124 A | 10/1994 | James |
| 5,390,985 A | 2/1995 | Chandler |
| 2002/0050741 A1* | 5/2002 | Gauthier ............... B29D 29/08 305/165 |

(Continued)

FOREIGN PATENT DOCUMENTS

| CN | 101472784 | 7/2009 |
| CN | 101804250 | 8/2010 |

(Continued)

OTHER PUBLICATIONS

Chinese Office Action (with translation) and Search Report for Application No. 201780002819.3 dated Nov. 4, 2020 (14 pages).

(Continued)

*Primary Examiner* — Jacob D Knutson
*Assistant Examiner* — Abigail R Hymel
(74) *Attorney, Agent, or Firm* — Neal, Gerber & Eisenberg LLP

(57) ABSTRACT

A transverse bar for tracks of snow groomers is defined by a section bar, which extends in a direction, and is provided with an inner cavity, which extends through the section bar in the direction, is laterally open in the direction, and is at least partially filled with a water-repellent polymer filling material.

9 Claims, 3 Drawing Sheets

(56) References Cited

U.S. PATENT DOCUMENTS

| | | | | |
|---|---|---|---|---|
| 2010/0225160 A1* | 9/2010 | Rainer | ................ | B62D 55/286 305/191 |
| 2011/0163595 A1 | 7/2011 | Kirchmair et al. | | |
| 2016/0257358 A1* | 9/2016 | Johnson | ................ | B62D 55/28 |

FOREIGN PATENT DOCUMENTS

| | | |
|---|---|---|
| CN | 202175125 U | 3/2012 |
| CN | 204750342 | 11/2015 |
| DE | 10110580 | 9/2002 |
| DE | 20 2013 011 423 | 3/2014 |
| EP | 0 922 629 | 6/1999 |
| JP | 2006123681 A | 5/2006 |
| WO | WO 2008/155425 | 12/2008 |
| WO | WO 2009/144291 | 12/2009 |

OTHER PUBLICATIONS

Notification Concerning Submission, Obtention or Transmittal of Priority Document for International Application No. PCT/IB2017/055908 dated Oct. 23, 2017.
International Search Report and Written Opinion for International Application No. PCT/IB2017/055908 dated Feb. 12, 2018.
Chinese Office Action (with translation) and Search Report for Application No. 201780002819.3 dated Jul. 16, 2021 (14 pages).

\* cited by examiner

TRANSVERSE BAR FOR TRACKS OF SNOW GROOMERS

PRIORITY CLAIM

This application is a national stage application of PCT/IB2017/055908, filed on Sep. 27, 2017, which claims the benefit of and priority to Italian Patent Application No. 102016000096899, filed on Sep. 27, 2016, the entire contents of which are each incorporated by reference herein.

TECHNICAL FIELD

The present disclosure relates to a transverse bar for tracks of snow groomers.

BACKGROUND

In the field of preparation of ski slopes, it is known to provide a snow groomer comprising a support frame, a driver's cabin centrally fitted on the support frame, and two tracks fitted on opposite sides of said support frame.

Each track comprises a set of wheels rotatably mounted on the support frame, a plurality of belts looped around the wheels, and a plurality of transverse bars fixed to the belts transversely to the forward direction of the track and configured to enable the gripping of the track itself on the snow of the ski slope.

Each transverse bar comprises a section bar, which is normally made of steel, aluminium or aluminium alloy, has a contoured shape, and is bounded by an outer surface having a substantially triangular shape.

The outer surface comprises a fixing portion, which is substantially flat and arranged in contact with a number of belts, which depends on the length of the transverse bar, and two lateral sides which project from the fixing portion and converge with each other.

The transverse bar also has an inner cavity, which extends through the section bar transversely to the forward direction of the track and is laterally open at its free ends.

The free ends of the inner cavity are normally closed by two caps fitted on the section bar so as to prevent the snow from entering said inner cavity.

Generally, the transverse bar is fixed to the respective belts by a fixing device comprising an inner plate inserted in the inner cavity and an outer plate arranged in contact with the belts on the opposite side of the section bar.

The assembly defined by the outer plate, the belts, the transverse bar and the inner plate is locked perpendicular to the belts by a plurality of fastening screws fitted through the outer plate, the belts and the transverse bar, and screwed on the inner plate.

The snow groomer is also equipped with a plurality of operating units, such as for example a milling cutter for processing the snow of the ski slopes, a shovel for moving snow masses along the ski slopes, and/or a winch assembly to ensure the stability of the snow groomer on relatively steep slopes and prevent slipping of the snow groomer if it loses adherence to the snow.

The known transverse bars for tracks of snow groomers of the type described above have a few drawbacks mainly resulting from the fact that, due to the presence of the two caps, these transverse bars have a relatively large number of components and are therefore relatively complex and relatively expensive.

Moreover, since the two caps are unable of ensuring a complete fluid-tight closure of the inner cavity under all conditions, the melting of the snow penetrated into the section bar increases the weight of the transverse bar, thus compromising the proper operation of the snow groomer.

Lastly, the known transverse bars for tracks of snow groomers of the type described above have the additional drawback that the snow of the ski slope is stained by the rust produced in the aforementioned fastening screws due to the melting of the snow penetrated into the section bar.

SUMMARY

The object of the present disclosure is to provide a transverse bar for tracks of snow groomers, which is free from certain of the drawbacks described above and is relatively simple and relatively economical to implement.

In certain embodiments, the present disclosure relates to a snow groomer track transverse bar including a section bar that: defines an elongated shape, and extends in a first direction. The section bar defines an inner cavity that extends through the section bar in the first direction, is laterally open in the first direction, and is at least partially filled with a water-repellent polymer filling material. The section bar is delimited by an outer surface including a fixing portion configured to be fixed to a belt of a track of a snow groomer.

In certain embodiments, the present disclosure relates to a snow groomer including a support frame, a driver cabin fitted on the support frame, and two tracks fitted on opposite sides of the support frame, each track including a plurality of parallel belts, and a plurality of transverse bars fixed to the belts. Each transverse bar includes a section bar that: has an elongated shape, extends in a first direction, and defines an inner cavity that extends through the section bar in the first direction, is laterally open in the first direction, and is at least partially filled with a water-repellent polymer filling material. The section bar is also delimited by an outer surface including a fixing portion configured to be fixed to at least one of the belts.

Additional features are described in, and will be apparent from the following Detailed Description and the figures.

BRIEF DESCRIPTION OF THE DRAWINGS

The present disclosure will now be described with reference to the accompanying drawings, which illustrate a non-limiting embodiment thereof, in which.

DETAILED DESCRIPTION

Figure 1:
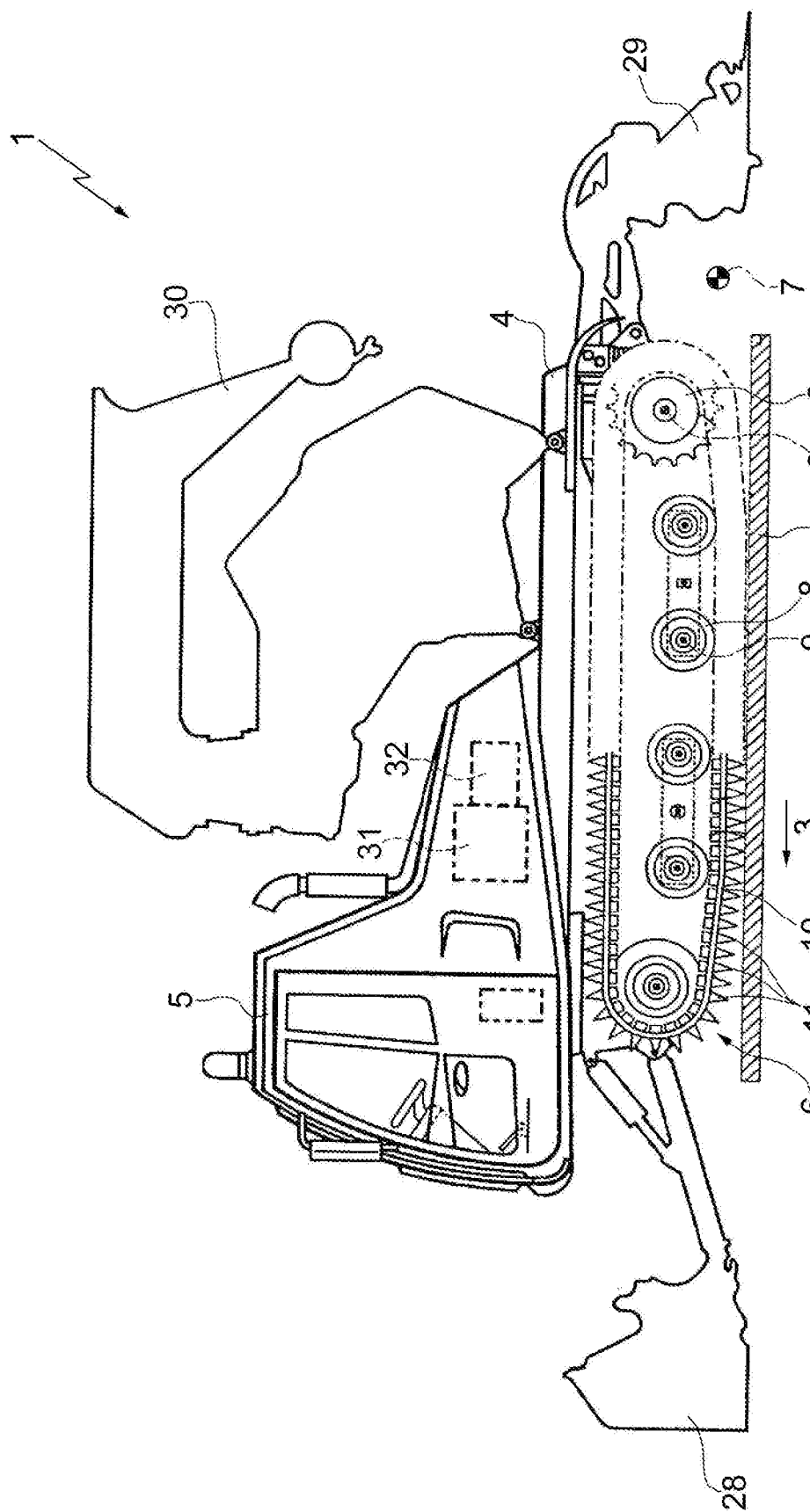
FIG. 1 is a schematic side view, with parts removed for clarity, of an embodiment of the snow groomer of the present disclosure.
Figure 2:
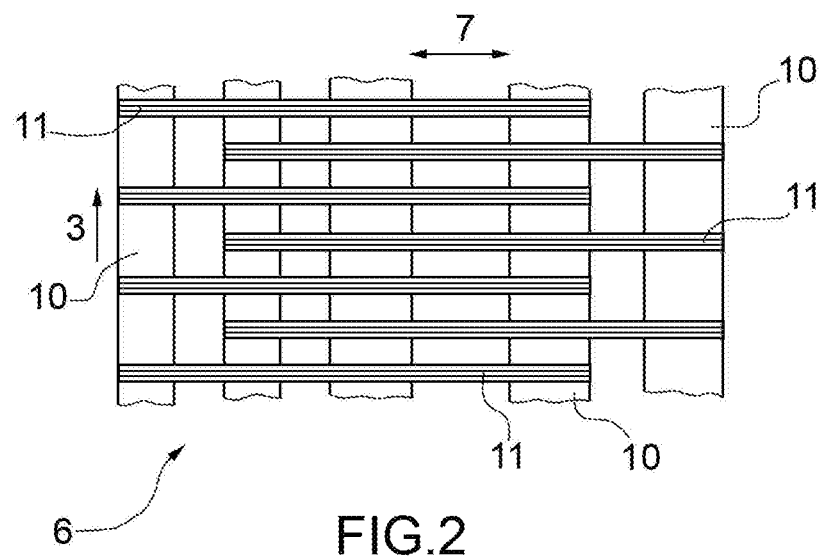
FIG. 2 is a schematic plan view, with parts removed for clarity, of a detail of the snow groomer in FIG. 1.
Figure 3:
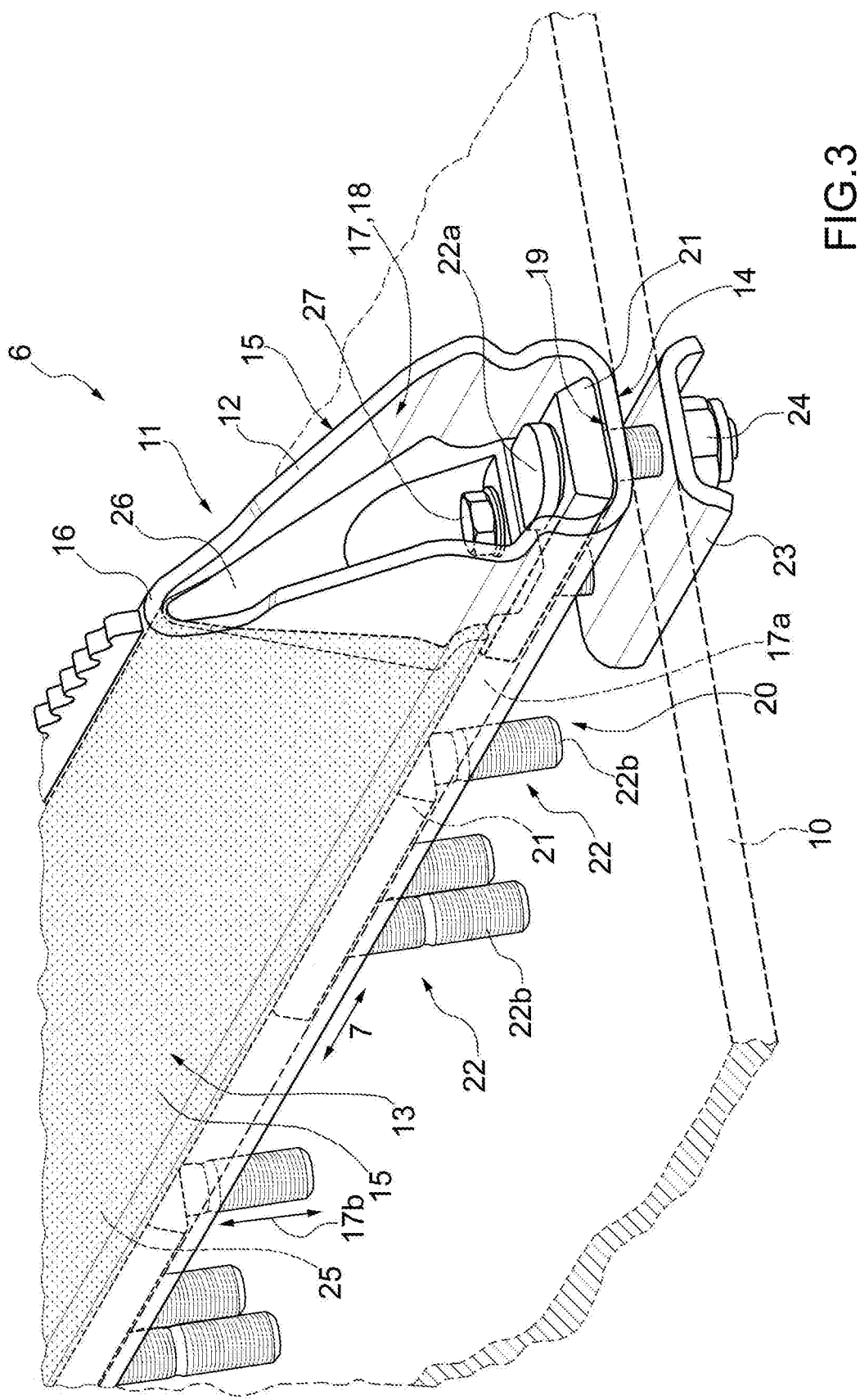
FIG. 3 is a schematic perspective view, with parts removed for clarity, of a detail of FIG. 2.

Referring now to the example embodiments of the present disclosure illustrated in FIGS. 1 to 3 and specifically with reference to FIGS. 1 and 2, the numeral 1 indicates, as a whole, a snow groomer for the preparation of ski slopes 2.

The snow groomer 1 is motorised to move along a slope 2 in a forward direction 3, and comprises a support frame 4, a driver's cabin 5 centrally fitted on the frame 4, and two tracks 6 (only one of which is shown in FIG. 1) fitted on opposite sides of the frame 4 in a direction 7 transverse to direction 3 and perpendicular to the plane of the sheet of FIG. 1.

Each track 6 comprises a set of wheels 8 mounted on the frame 4 so as to rotate about respective rotation axes 9 parallel to direction 7, and a plurality of belts 10 movable in respective vertical containment planes parallel to each other and perpendicular to said direction 7.

Each belt 10 is looped around the front wheel 8 and the rear wheel 8, and has a lower branch, which is kept in contact with the slope 2 by the intermediate wheels 8.

The track 6 also comprises a plurality of transverse bars 11, which are fixed to the respective belts 10 parallel to direction 7, and are configured to enable the gripping of said track 6 on the snow of the ski slope 2.

Each bar 11 comprises a section bar 12, which is in certain embodiments, but not necessarily all embodiments, made of steel, aluminium or aluminium alloy, has a contoured shape, and is bounded by an outer surface 13 having a substantially triangular shape.

The surface 13 comprises a fixing portion 14, which is substantially flat and arranged in contact with a number of belts 10, which depends on the length of the bar 11, and two lateral sides 15, which project from the portion 14, converge with each other, and are connected to one another at an end portion 16 of the section bar 12 opposite the portion 14 itself.

Each bar 11 also has an inner cavity 17, which extends through the section bar 12 in direction 7 and is laterally open in direction 7.

The cavity 17 is bounded by an inner surface 18 comprising a substantially flat coupling portion 19 parallel and opposite to the portion 14 of the surface 13.

The bar 11 is fixed to the respective belts 10 by a fixing device 20 comprising, in this case, a plurality of inner plates 21 inserted in the cavity 17 in contact with the portion 19.

Each plate 21 is provided with a plurality of fastening screws 22, which are locked by interference through the plate 21 and extend through the section bar 12 and the respective belt 10.

In addition, the screws 22 of each plate 21 extend through an outer plate 23, which is arranged in contact with the respective belt 10 on the opposite side of the section bar 12, and is locked against the belt 10 itself by a plurality of fastening nuts 24, each screwed on a respective screw 22.

In connection with the above, it should be pointed out that each screw 22 has a head 22a arranged inside the cavity 17 and a stem 22b, which extends through the respective plate 21, the section bar 12, the respective belt 10 and the respective plate 23, and protrudes from the respective plate 23, being then screwed into the respective nut 24.

The cavity 17 is at least partially filled with a water-repellent polymer material 25, in particular a low-density one.

The filling material 25 prevents snow and ice from penetrating into the cavity 17, which allows the weight exerted by the transverse bars 11 on the belts 10 to be reduced, and hence provides enhancement of the snow groomer's 1 performance. In this case, the cavity 17 is partially filled with the material 25 so as to allow the material 25 to define, together with the section bar 12, a feed channel 17a to move the plates 21 along the cavity 17 and lock the plates 21 inside the cavity 17 in a direction 17b perpendicular to the portion 19.

Consequently, since the plates 21 and the respective fastening screws 22 are locked along the cavity 17 in the direction 17b and cannot fall into the section bar 12, the first assembly of the tracks 6 and the subsequent replacement of the belts 10 involve relatively simple and relatively fast assembly and/or maintenance operations.

According to a variant not shown, once the plates 21 are positioned inside the cavity 17, the entire cavity 17 is filled with the material 25 so as to lock the plates 21 inside the cavity 17 also in the direction 7.

The two free ends of the cavity 17 of each bar 11 are closed by respective shaped caps 26, which are made of a plastic material, extend within the cavity 17, and prevent snow and ice from coming into contact with and damaging the material 25.

Each cap 26 is locked along the section bar 12 in the direction 7 by at least one fastening screw 27, which extends through the cap 26, and is screwed on a corresponding plate 21.

According to a variant not shown, the caps 26 are eliminated.

The snow groomer 1 is also provided with a shovel 28 connected to the front of the frame 4 to move snow masses along the slope 2, a milling cutter 29 connected to the rear of the frame 4 configured to process the snow of the slope 2, and a winch assembly 30 fitted above the frame 4 itself.

The snow groomer 1 also comprises an internal combustion engine 31 connected with at least one of the front and rear wheels 8, the shovel 28, the milling cutter 29 and the winch assembly 30 by a suitable transmission unit 32.

The scope of protection of the present disclosure is defined by the claims which cover variants not specifically described and equivalent embodiments. As such, the present disclosure also covers embodiments not described in the detailed description and equivalent embodiments that fall within scope of the appended claims. Accordingly, various changes and modifications to the presently disclosed embodiments will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A snow groomer track transverse bar comprising:
a section bar of an elongated shape that defines an inner cavity that extends through the section bar in a first direction, is laterally open in the first direction, and is at least partially filled with a water-repellent polymer filling material, and is delimited by an outer surface including a fixing portion configured to be fixed to a belt of a track of a snow groomer.

2. The snow groomer track transverse bar of claim 1, wherein the filling material comprises a low-density water-repellent polymer material.

3. The snow groomer track transverse bar of claim 1, wherein the fixing portion is configured to be fixed to the belt by a fixing device configured to be fitted in the inner cavity, and the filling material locks the fixing device inside the inner cavity in at least one of: the first direction and a second direction that is perpendicular to the fixing portion.

4. The snow groomer track transverse bar of claim 3, wherein the fixing device comprises:
an inner plate in the inner cavity;
an outer plate on an opposite side of the section bar relative to the belt;
a fastening screw that extends through the inner plate, the section bar, the belt, and the outer plate; and
a fastening nut screwed onto the fastening screw.

5. The snow groomer track transverse bar of claim 4, wherein the filling material partially fills the inner cavity to define, together with the section bar, a feed channel to move the inner plate along the inner cavity.

6. The snow groomer track transverse bar of claim 5, wherein the filling material is arranged in the inner cavity to lock the inner plate in the second direction that is perpendicular to the fixing portion.

7. The snow groomer track transverse bar of claim 4, wherein the filling material locks the inner plate in the first direction.

8. The snow groomer track transverse bar of claim 1, further comprising two closing caps configured to close free ends of the section bar.

9. A snow groomer comprising:
- a support frame;
- a driver cabin fitted on the support frame; and
- two tracks fitted on opposite sides of the support frame, each track comprising:
  - a plurality of parallel belts, and
  - a plurality of transverse bars fixed to the belts, each transverse bar comprising a section bar of an elongated shape that defines an inner cavity that extends through the section bar in a first direction, is laterally open in the first direction, and is at least partially filled with a water-repellent polymer filling material, and is delimited by an outer surface including a fixing portion configured to be fixed to at least one of the belts.

* * * * *